United States Patent
Lee et al.

(10) Patent No.: US 8,848,357 B2
(45) Date of Patent: Sep. 30, 2014

(54) ELECTRONIC DEVICE WITH CONNECTOR

(75) Inventors: Sheng-Hung Lee, New Taipei (TW);
Li-Ping Chen, New Taipei (TW);
Xian-Huang Gao, Shenzhen (CN);
Jin-Jia Yu, Shenzhen (CN);
Cheng-Wang Zhao, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 259 days.

(21) Appl. No.: 13/543,648

(22) Filed: Jul. 6, 2012

(65) Prior Publication Data

US 2013/0329371 A1    Dec. 12, 2013

(30) Foreign Application Priority Data

Jun. 11, 2012  (CN) .......................... 2012 1 0189908

(51) Int. Cl.
*G06F 1/16* (2006.01)
(52) U.S. Cl.
USPC ................... 361/679.32; 360/99.08; 345/690; 248/220.21; 174/650
(58) Field of Classification Search
CPC ........................................................ G06F 1/00
USPC ........ 248/221, 11, 636, 224.8, 220.21, 309.1, 248/314, 220.22, 122.1, 558, 181.1, 310, 248/74.2; 455/556.1, 566, 179.1, 2.01, 455/575.1, 550.1; 345/173, 174, 204, 55, 345/690, 419, 32, 168, 652, 520, 170, 107; 165/80.2, 104.26, 104.14, 104.33, 165/80.3, 61; 360/294.5, 99.08, 234.4, 128, 360/97.14, 97.22, 97.16, 245.8, 254, 264.2, 360/90.2; 361/679.31, 679.32, 679.33, 361/679.35, 679.37, 679.38, 679.4, 679.43, 361/679.47, 679.54, 679.21, 679.26, 361/679.16, 679.09, 679.55, 679.59, 361/679.02, 679.56, 679.39; 174/650, 21 R, 174/17 R, 59, 363
See application file for complete search history.

(56) References Cited

U.S. PATENT DOCUMENTS

| | | | |
|---|---|---|---|
| 7,301,768 B2 * | 11/2007 | Fan et al. ....................... | 361/695 |
| 2005/0201052 A1 * | 9/2005 | Chen et al. .................... | 361/685 |
| 2012/0125565 A1 * | 5/2012 | Zhang et al. ................... | 165/67 |
| 2013/0315728 A1 * | 11/2013 | Zhou et al. ................ | 415/213.1 |

* cited by examiner

*Primary Examiner* — Hung Duong
(74) *Attorney, Agent, or Firm* — Novak Druce Connolly Bove + Quigg LLP

(57) ABSTRACT

An electronic device includes an enclosure, a bracket, a connector, and a fan. The enclosure includes a bottom plate and two side plates located on the bottom plate. The bracket is secured to the side plates and includes a bottom wall. The bottom wall is substantially parallel to the bottom plate and defines an installing opening. Two locking pieces extend from two opposite edges of the installing opening. Each of the locking pieces defines a locking hole. The connector is secured in the installing opening, the connector comprising two resilient portions. A locking protrusion protrudes from each of the resilient portions. The locking protrusions of the resilient portions engage in the locking holes of the locking pieces. The resilient portions are deformable to disengage the locking protrusions from the locking holes. The fan is received in the bracket and adapted to be electrically coupled to the connector.

19 Claims, 7 Drawing Sheets

ELECTRONIC DEVICE WITH CONNECTOR

BACKGROUND

1. Technical Field

The present disclosure relates to electronic devices, and particularly to an electronic device with a connector.

2. Description of Related Art

In a computer system, a fan is provided to cool the computer system. The fan can be hot-plugged in a connector, so as to be powered on. However, if the connector is secured to a motherboard, changing the position of the fan means that the fan can no longer use that connector. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
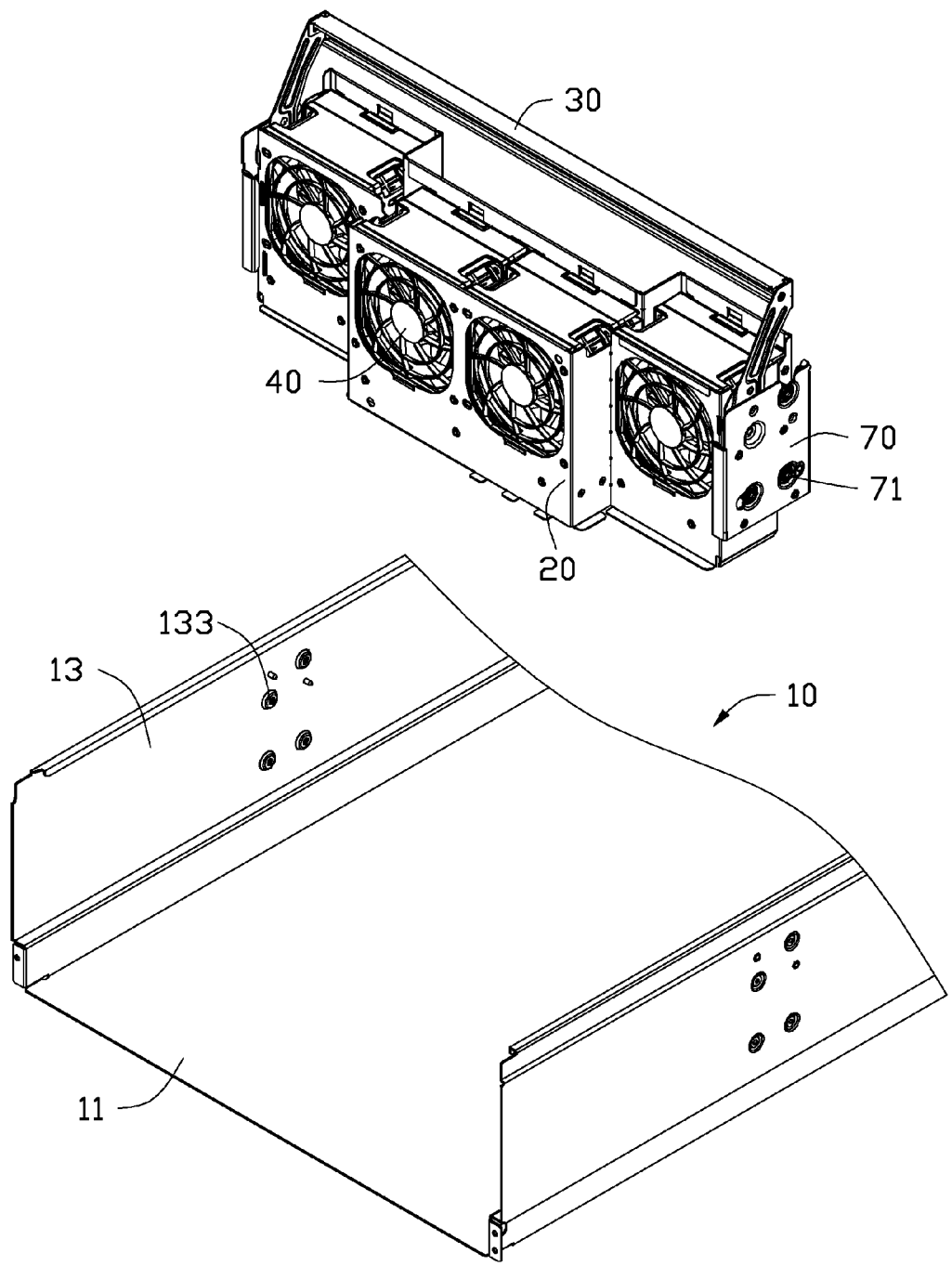
FIG. 1 is an exploded, isometric view of an enclosure and an assembly of a bracket, an operating member, four fans, and four connectors in accordance with an embodiment.

Referring to FIG. 1, a mounting apparatus in accordance with an embodiment includes an enclosure 10 and a bracket 20.

The enclosure 10 includes a bottom plate 11 and two side plates 13 located on opposite two edges of the bottom plate 11. In one embodiment, the side plates 13 are substantially parallel to each other and perpendicular to the bottom plate 11. Each side plate 13 defines a plurality of mounting holes 131.

Figure 2:
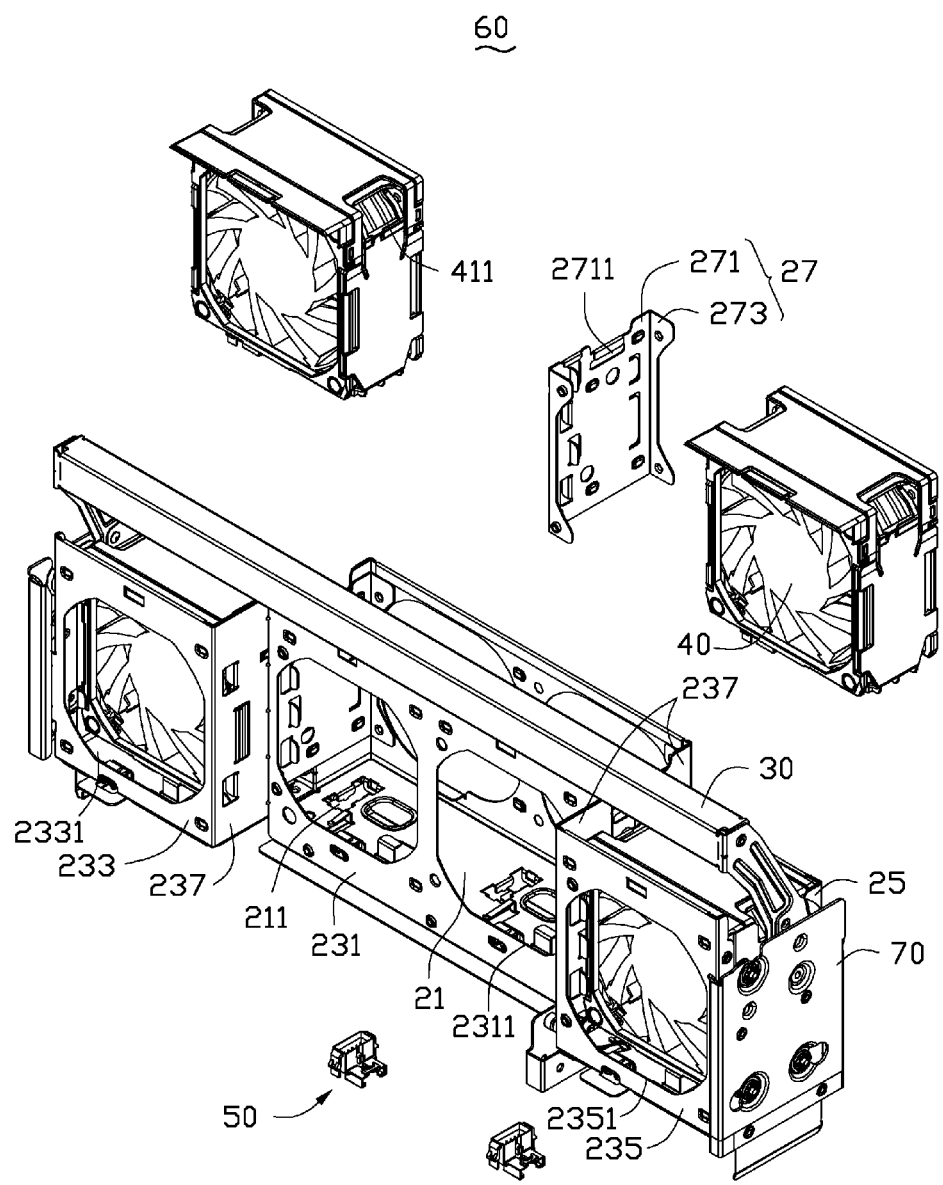
FIG. 2 is an exploded, isometric view of the assembly of FIG. 1.

Referring to FIG. 2, the bracket 20 includes a bottom wall 21, two sidewalls 23, two connecting walls 25, and a separating wall 27. The sidewalls 23 and the two connecting walls 25 are substantially perpendicular to the bottom wall 21. The two sidewalls 23 are located on two opposite edges of the bottom wall 21. The two connecting walls 25 are located at opposite edges of the bottom wall 21. Each of the two connecting walls 25 is connected to the two sidewalls 23. Each of the two sidewalls 23 includes a first wall 231, a second wall 233, and a third wall 235, which are substantially parallel to each other and perpendicular to the bottom wall 21. The first wall 231 is located between the second wall 233 and the third wall 235 and is connected to the second wall 233 and the third wall 235 with connecting walls 237. The connecting walls 237 are substantially perpendicular to the first wall 231 and the bottom wall 21. Each first wall 231 defines two first through openings 2311, each second wall 233 defines a second through opening 2331, and each third wall 235 defines a third through opening 2351.

Figure 4:
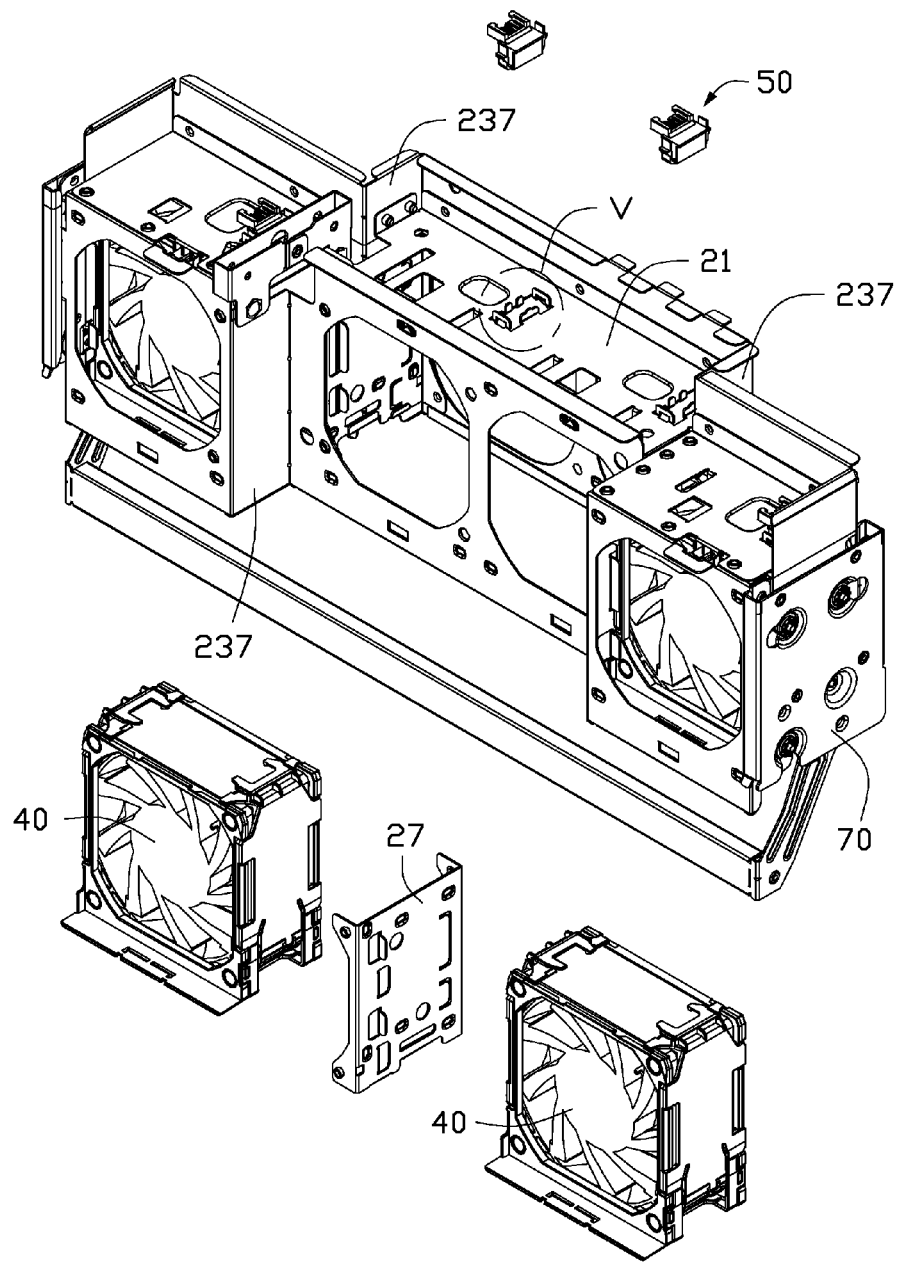
FIG. 4 is another exploded view of the assembly of FIG. 1.
Figure 5:
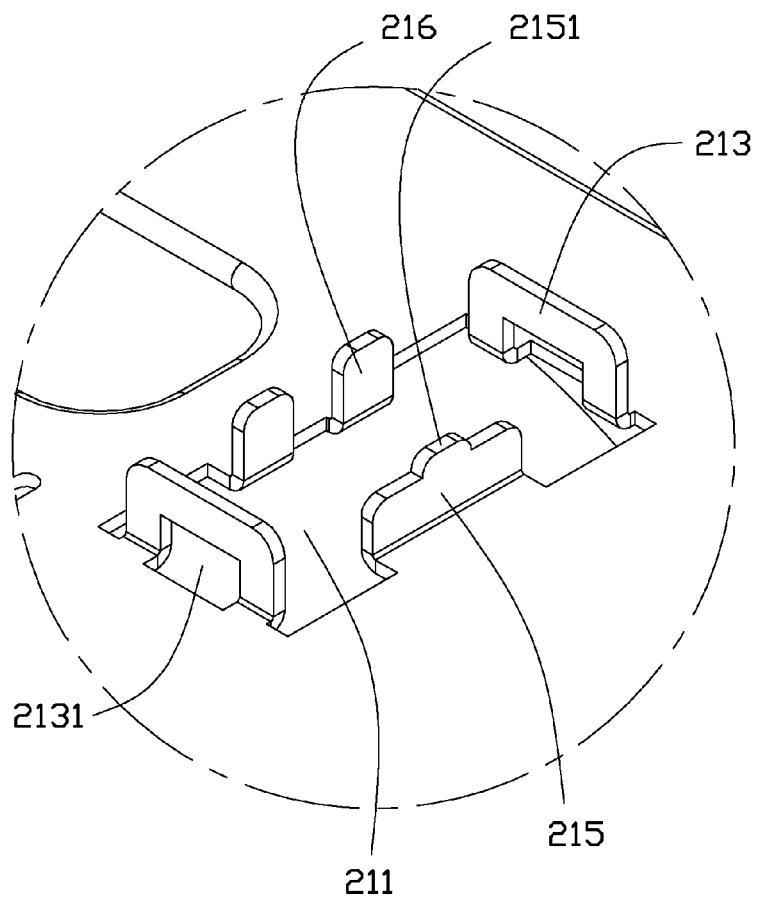
FIG. 5 is an enlarged view of a circled portion V of FIG. 4.

Referring to FIGS. 4 and 5, the bottom wall 21 defines four installing openings 211. Two locking pieces 213 extend outward from opposite edges of each installing opening 211, and a limiting piece 215 and two positioning pieces 216 extends from other opposite edges of each installing opening 211. A tab 2151 extends from an edge of the limiting piece 215. Each locking pieces 213 defines a locking hole 2133.

The separating wall 27 is secured on the bottom wall 21 between the two first walls 231. The separating wall 27 includes a base board 271 and two opposite mounting flanges 273. The base board 271 defines a securing hole 2711. The two opposite mounting flanges 273 are secured to the two first walls 231, and the separating wall 27 is located in the bracket 20 between the two first walls 231.

Figure 3:
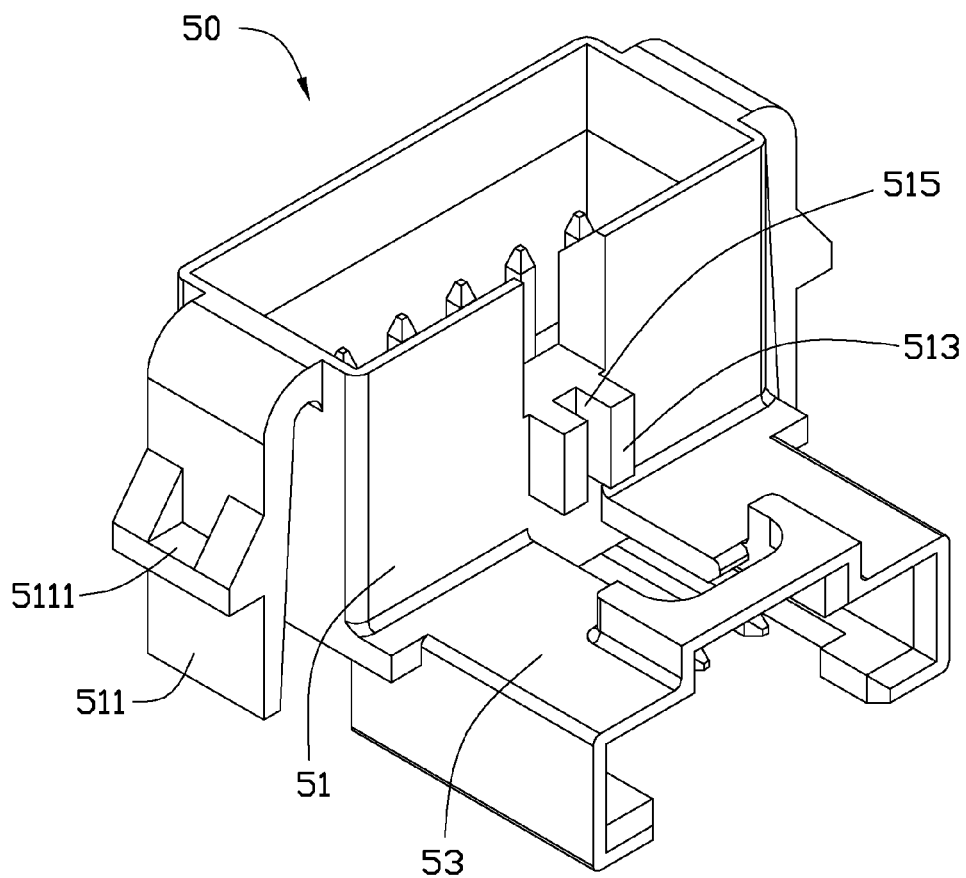
FIG. 3 is an isometric view of one of the four connectors of FIG. 1.

Four connectors 50 are configured to be secured in the four installing openings 211 of the bottom wall 21. Referring to FIG. 3, each connector 50 includes a first part 51 and a second part 53 extending from the first part 51. The first part 51 is configured to be inserted into the installing opening 211. Two resilient portions 511 extend from opposite sides of the first part 51. A locking protrusion 5111 protrudes from each resilient portion 511. Two blocks 513 protrude from another side of the first part 51. A slot 515 is defined between the two blocks 513.

Figure 6:
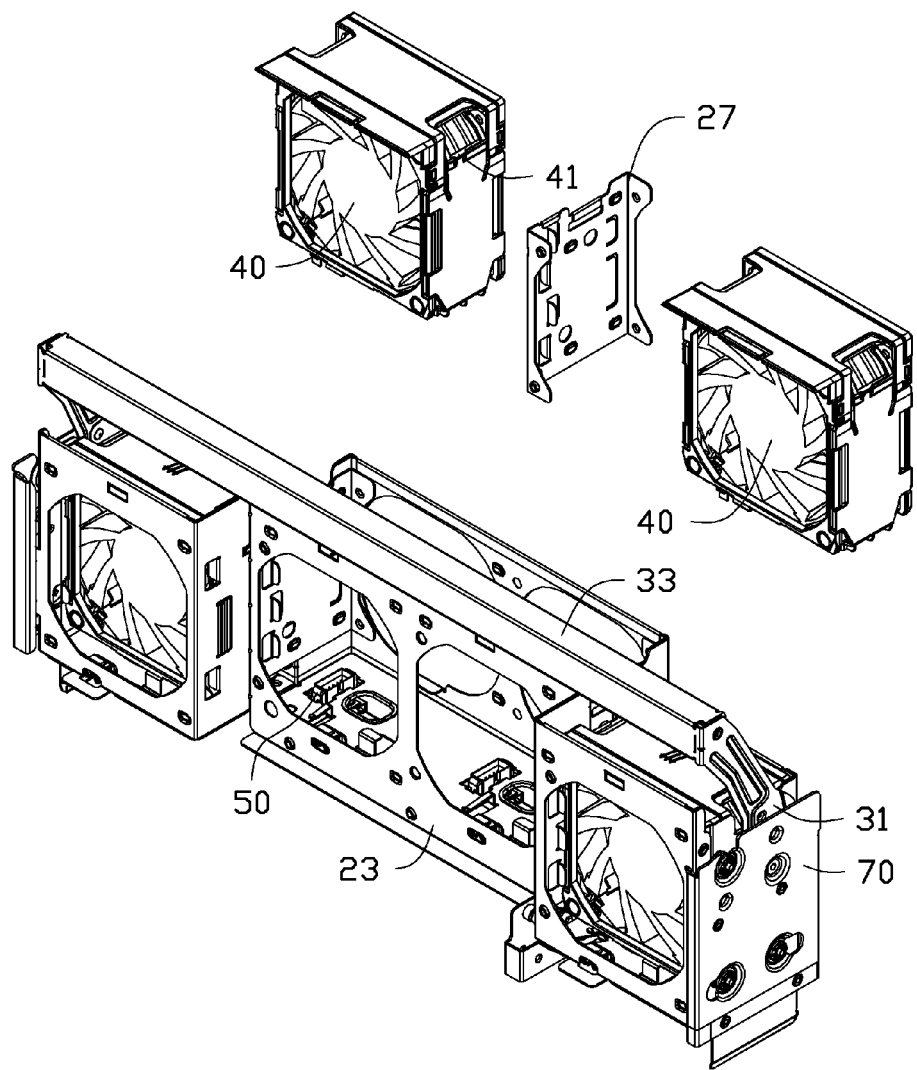
FIG. 6 is similar to FIG. 2, but shows the four connectors secured to the bracket.
Figure 7:
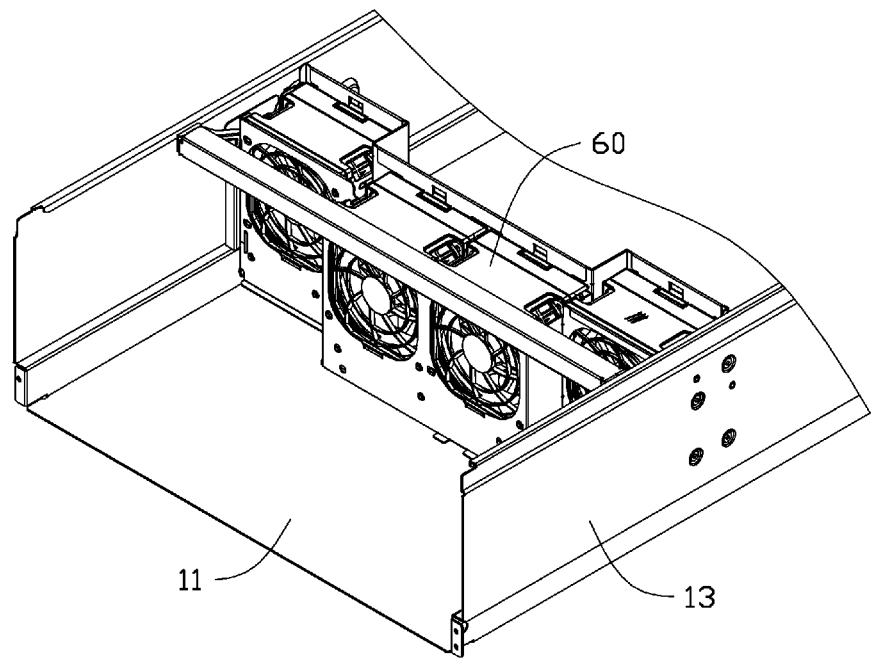
FIG. 7 is an assembled view of the electronic device of FIG. 1.

Referring to FIGS. 2, 4 and 6, in assembling each connector 50, the first part 51 is inserted into the installing opening 211 from a bottom side of the bottom wall 21. The tab 2151 corresponds to the slot 515 of the connector 50. When the two locking pieces 213 press against the two locking protrusions 5111 of the two resilient portions 511, the resilient portions 511 are deformed towards the first part 51. Until the two locking protrusions 5111 pass across the two locking pieces 213, the two resilient portions 511 return to engage the locking protrusions 5111 into the locking holes 2133. The tab 2151 is inserted into the slot 515. The two blocks 513 abut the limiting piece 215. The limiting piece 215 and the two positioning pieces 216 sandwich the first part 51. The second part 53 is located outside of the bracket 20 below the bottom wall 21. Thereby, the connector 50 is secured to the bottom wall 21 of the bracket 20.

When the connector 50 is to be removed from the bracket 20, the resilient portions 511 are pressed to deform towards the first part 51 from a bottom side of the bracket 20, until the locking protrusions 5111 disengage from the locking holes 2133. Therefore, the connector 50 can be removed out of the installing opening 211.

Referring to FIG. 1, four fans 40 can be received in the bracket 20, corresponding to each of the two first through openings 2311, the second through opening 2331 and the third through opening 2351. Two of the four fans 40 are secured between the first walls 231, one is secured between the second walls 233, and the final fan is secured between the third walls 235. Each fan 40 includes a resilient portion 41, and a latch 411 extends from the resilient portion 41. The latches 411 of three of the four fans 40 can be engaged with portions (not shown) of the bracket 20, and the latch 411 of the last fan 40 is engaged in the securing holes 2711. The connectors 50 can be electrically coupled to a motherboard (not shown) in the enclosure and fan connectors (not shown) of the fans 40.

Referring to FIGS. 1-2 and 4-7, an operating member 30 is rotatably secured to the two connecting walls 25 of the bracket 20. Two mounting plates 70 are secured to inner surfaces of the two side plates 13 of the enclosure 10. Each of the two mounting plates 70 defines a plurality of fixing holes 71, corresponding to the mounting holes 131 of each of the two side plates 13. A plurality of fasteners, such as screws, are engaged in the mounting holes 131 and the fixing holes 71, to secure the two mounting plates 70 to the two side plates 13. The operating member 30 can be engaged with the two mounting plates 70 to secure the bracket 20 to the two side plates 13. Thereby, the bracket 20 is secured in the enclosure 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device, comprising:
    an enclosure comprising a bottom plate and two side plates located on the bottom plate;
    a bracket secured to the two side plates, the bracket comprising a bottom wall, the bottom wall substantially parallel to the bottom plate, the bottom wall defining an installing opening, two locking pieces extending from two opposite edges of the installing opening, and each of the two locking pieces defining a locking hole;
    a connector secured in the installing opening, the connector comprises two resilient portions, a locking protrusion protruding from each of the two resilient portions, and the locking protrusions of the two resilient portions are engaged in the locking holes of the two locking pieces; wherein the two resilient portions are resiliently deformable to disengage the locking protrusions from the locking holes; and
    a fan received in the bracket and adapted to electrically coupled to the connector.

2. The electronic device of claim 1, wherein the connector comprises a first part and a second part that extends from the first part, the first part is inserted in the installing opening, and the second part are located outside of the bracket.

3. The electronic device of claim 2, wherein a limiting piece and a positioning piece extends from another two opposite edges of the installing opening, and the first part is sandwiched between the two resilient portions and between the limiting piece and the positioning piece.

4. The electronic device of claim 3, wherein a tab extends from the limiting piece, two blocks are located on the first part, a slot is defined between the two blocks, and the tab is engaged in the slot.

5. The electronic device of claim 4, wherein the limiting piece abuts the two blocks.

6. The electronic device of claim 1, wherein the bracket further comprises two sidewalls located on the bottom wall, and the two sidewalls are substantially perpendicular to the bottom wall; and the fan is located between the two sidewalls.

7. The electronic device of claim 6, wherein each of the two sidewalls comprising a first wall, a second wall, and a third wall; and the first walls, the second walls, and the third walls of the two sidewalls are substantially parallel to each other.

8. The electronic device of claim 7, wherein the first walls are connected to the second walls and the third walls with connecting walls, and the connecting walls are substantially perpendicular to the bottom wall and each of the first walls, the second walls, and the third walls.

9. The electronic device of claim 7, wherein the bracket further comprises a separating wall, the separating wall comprises a base board and two mounting flanges located on opposite edges of the base board, the base board is substantially perpendicular to the two first walls, and the two mounting flanges are secured to the two first walls.

10. An electronic device, comprising:
    an enclosure comprising a bottom plate and two side plates located on the bottom plate;
    a bracket secured to the two side plates above the bottom plate, the bracket comprising a bottom wall, the bottom wall defining an installing opening, two locking pieces extending from two opposite edges of the installing opening, and each of the two locking pieces defining a locking hole; and
    a connector adapted to be electrically connected to a fan, the connector comprises a first part and a second part extending from the first part, the first part secured in the installing opening; the second part located outside of the bracket; the first part comprising two resilient portions, a locking protrusion protruding from each of the two resilient portions, and the locking protrusions of the two resilient portions are engaged in the locking holes of the two locking pieces; wherein the two resilient portions are resiliently deformable to disengage the locking protrusions from the locking holes.

11. The electronic device of claim 10, wherein the connector comprises a first part and a second part that extends from the first part, the first part is inserted in the installing opening, and the second part are located outside of the bracket.

12. The electronic device of claim 11, wherein a limiting piece and a positioning piece extends from another two opposite edges of the installing opening, and the first part is sandwiched between the two resilient portions and between the limiting piece and the positioning piece.

13. The electronic device of claim 12, wherein a tab extends from the limiting piece, two blocks are located on the first part, a slot is defined between the two blocks, and the tab is engaged in the slot.

14. The electronic device of claim 13, wherein the limiting piece abuts the two blocks.

15. The electronic device of claim 10, wherein the bracket further comprises two sidewalls located on the bottom wall, and the two sidewalls are substantially perpendicular to the bottom wall, and the fan is located between the two sidewalls.

16. The electronic device of claim 15, wherein each of the two sidewalls comprising a first wall, a second wall, and a third wall; and the first walls, the second walls, and the third walls of the two sidewalls are substantially parallel to each other.

17. The electronic device of claim 16, wherein the first walls are connected to the second walls and the third walls with connecting walls, and the connecting walls are substantially perpendicular to the bottom wall and each of the first walls, the second walls, and the third walls.

18. The electronic device of claim 16, wherein the bracket further comprises a separating wall, the separating wall comprises a base board and two mounting flanges located on opposite edges of the base board, the base board are substantially perpendicular to the two first walls, and the two mounting flanges are secured to the two first walls.

19. The electronic device of claim 10, wherein the bottom wall substantially parallel to the bottom plate.

\* \* \* \* \*